United States Patent
Datcuk, Jr.

(10) Patent No.: US 6,877,686 B2
(45) Date of Patent: Apr. 12, 2005

(54) LOCKING DRAG COVER

(75) Inventor: Peter T. Datcuk, Jr., Sewell, NJ (US)

(73) Assignee: Penn Fishing Tackle Manufacturing Co., Philadelphia, PA (US)

( * ) Notice: Subject to any disclaimer, the term of this patent is extended or adjusted under 35 U.S.C. 154(b) by 0 days.

(21) Appl. No.: 10/623,024

(22) Filed: Jul. 19, 2003

(65) Prior Publication Data

US 2005/0011978 A1 Jan. 20, 2005

(51) Int. Cl.[7] .............................................. A01K 89/01
(52) U.S. Cl. ........................ 242/245; 242/314; 242/318
(58) Field of Search ........................ 242/845, 310–315, 242/318, 319

(56) References Cited

U.S. PATENT DOCUMENTS

| | | | |
|---|---|---|---|
| 3,771,746 A * | 11/1973 | Griste | 242/255 |
| 4,560,118 A * | 12/1985 | Weber et al. | 242/255 |
| 4,651,949 A * | 3/1987 | Sato | 242/271 |
| 4,813,629 A * | 3/1989 | Hashimoto et al. | 242/271 |
| 4,852,826 A * | 8/1989 | Sato | 242/270 |
| 5,150,854 A * | 9/1992 | Noda | 242/310 |
| 5,219,131 A * | 6/1993 | Furomoto | 242/223 |
| 5,297,756 A * | 3/1994 | Ikuta | 242/270 |
| 5,415,359 A * | 5/1995 | Ikuta | 242/271 |
| 6,145,073 A * | 11/2000 | Cismas | 712/25 |
| 6,286,773 B1 * | 9/2001 | Ikuta | 242/260 |
| 6,412,720 B1 * | 7/2002 | Ikuta | 242/269 |
| 2003/0111569 A1 * | 6/2003 | Hitomi | 242/321 |

* cited by examiner

Primary Examiner—Emmanuel Marcelo
(74) Attorney, Agent, or Firm—Frank J. Benasutti

(57) ABSTRACT

A fishing reel, having a spool and a drag mechanism having a drag washer therein, is provided with a drag cover means to cover said drag mechanism; and locking means engaging said drag cover means and said drag washer to lock said drag washer in position within said reel.

4 Claims, 5 Drawing Sheets

LOCKING DRAG COVER

BACKGROUND OF THE INVENTION

1. Field of the Invention

This invention relates to fishing reels, and more particularly to drag mechanisms contained within said reels.

2. Description of the Prior Art

In the prior art, it is known to have drag mechanisms associated with the spools of fishing reels. These drag mechanisms are contained within the housing of the reel.

Although the housing is usually finished with an outer cover, it is desirable to have an internal cover for the drag mechanism. Further, it is necessary to provide some means to permit said inside cover from backing off during the operation of the fishing reel.

SUMMARY OF THE INVENTION

My invention provides a locking means for locking an internal cover to the drag plate within a fishing reel. I have invented an improvement in a fishing reel having a spool and a drag mechanism having a drag washer therein, comprising: a drag cover means to cover said drag mechanism; and locking means engaging said drag cover means and said drag washer to lock said drag washer in position within said reel. The drag cover means comprises a drag cover in threaded engagement with the spool. The drag washer has at least one notch and the drag cover means has a spring-biased pin means therein for engagement with said notch. A retraction means is provided for engaging said spring-biased pin means to provide a means for retracting said pin means from said notch, comprising a clip; and said drag cover has two surfaces, one for engaging said clip when said pin means engages said notch and one for engaging said clip when said pin means is retracted from said notch.

DESCRIPTION OF THE PREFERRED EMBODIMENTS

Figure 3:
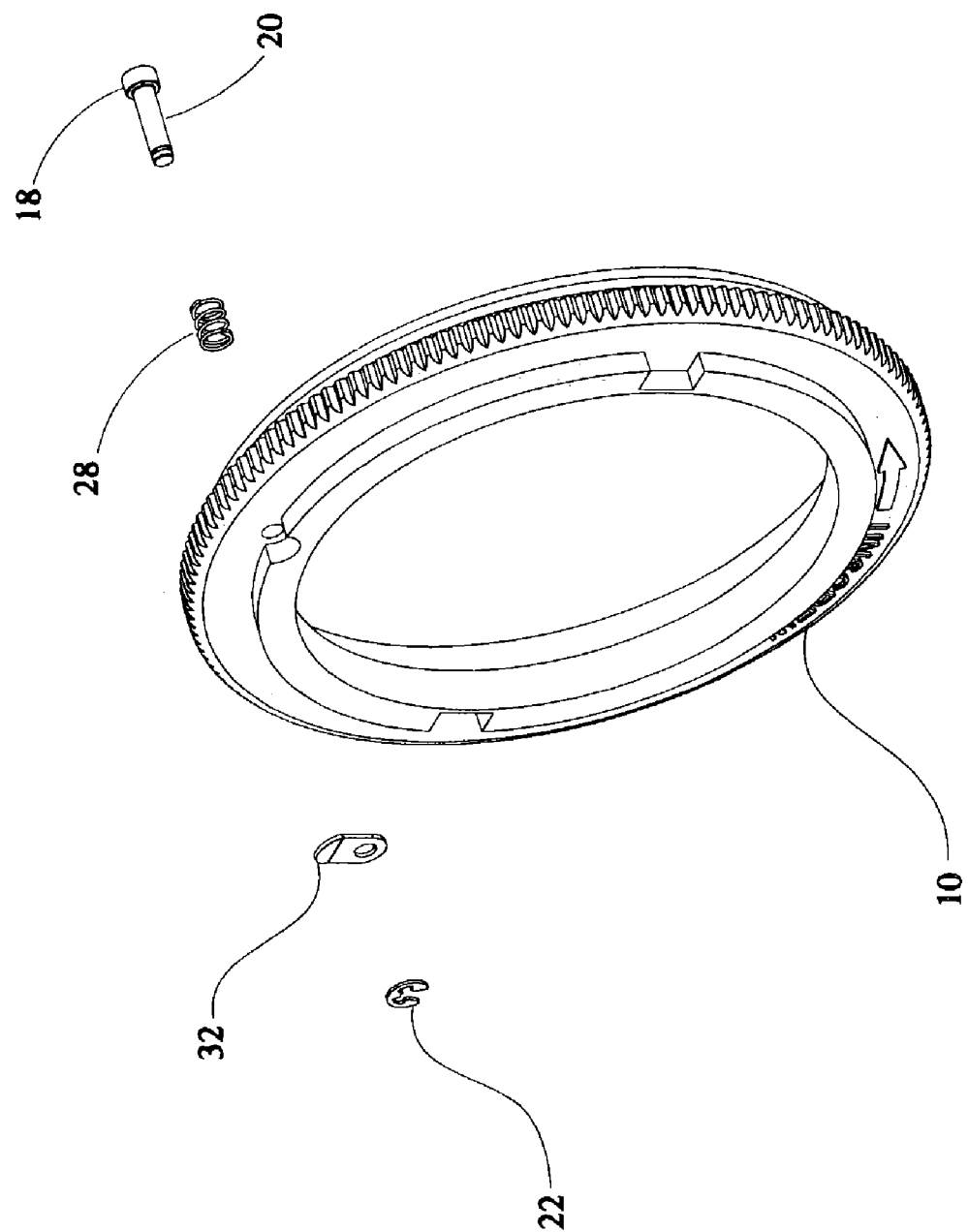
FIG. 3 is an exploded perspective view of the portion of the apparatus constituting my locking drag cover shown in juxtaposition with FIG. 2 to illustrate the interaction between the parts thereof.

Referring to the Figures, FIG. 3 shows a cover 10 which is used to shield a drag mechanism from the elements. This cover is placed within the housing 11, FIG. 1, of a fishing reel. The cover 10 is threadedly engaged with the spool 12, as shown at 14, FIG. 1.

Figure 1:
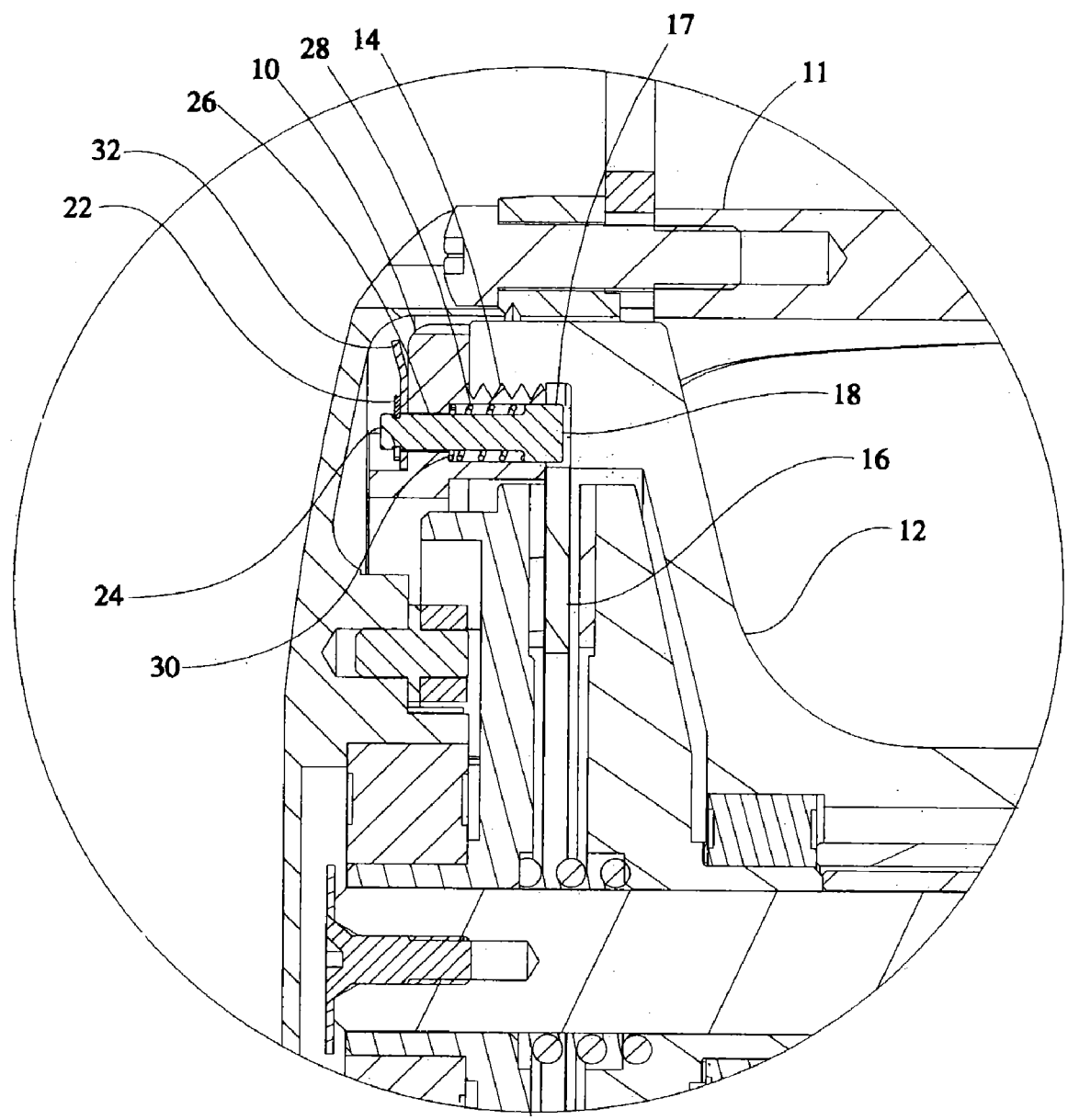
FIG. 1 shows a portion of a fishing reel partially in section, including a portion of a locking drag cover in accordance with my invention.
Figure 2:
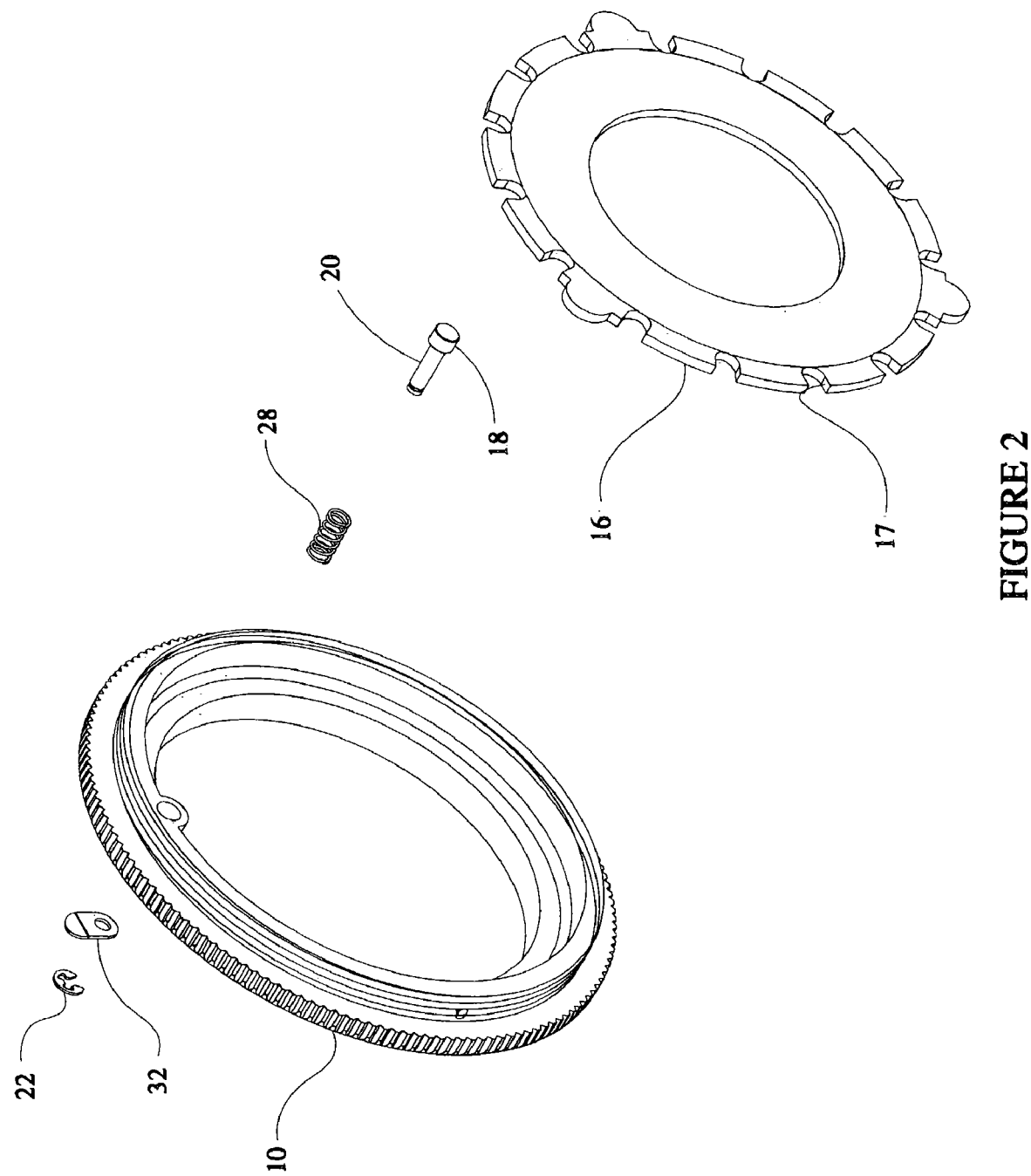
FIG. 2 is a perspective view of a drag washer which forms a portion of the reel shown in FIG. 1.
Figure 4:
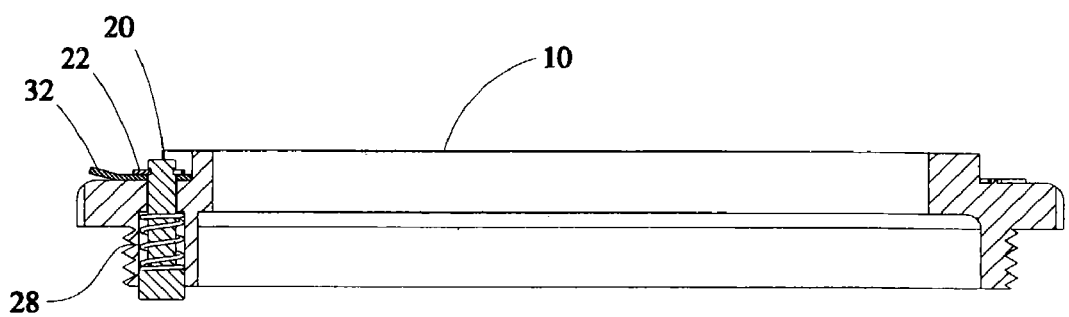
FIG. 4 is a section of a cover in accordance with my invention.
Figure 5:
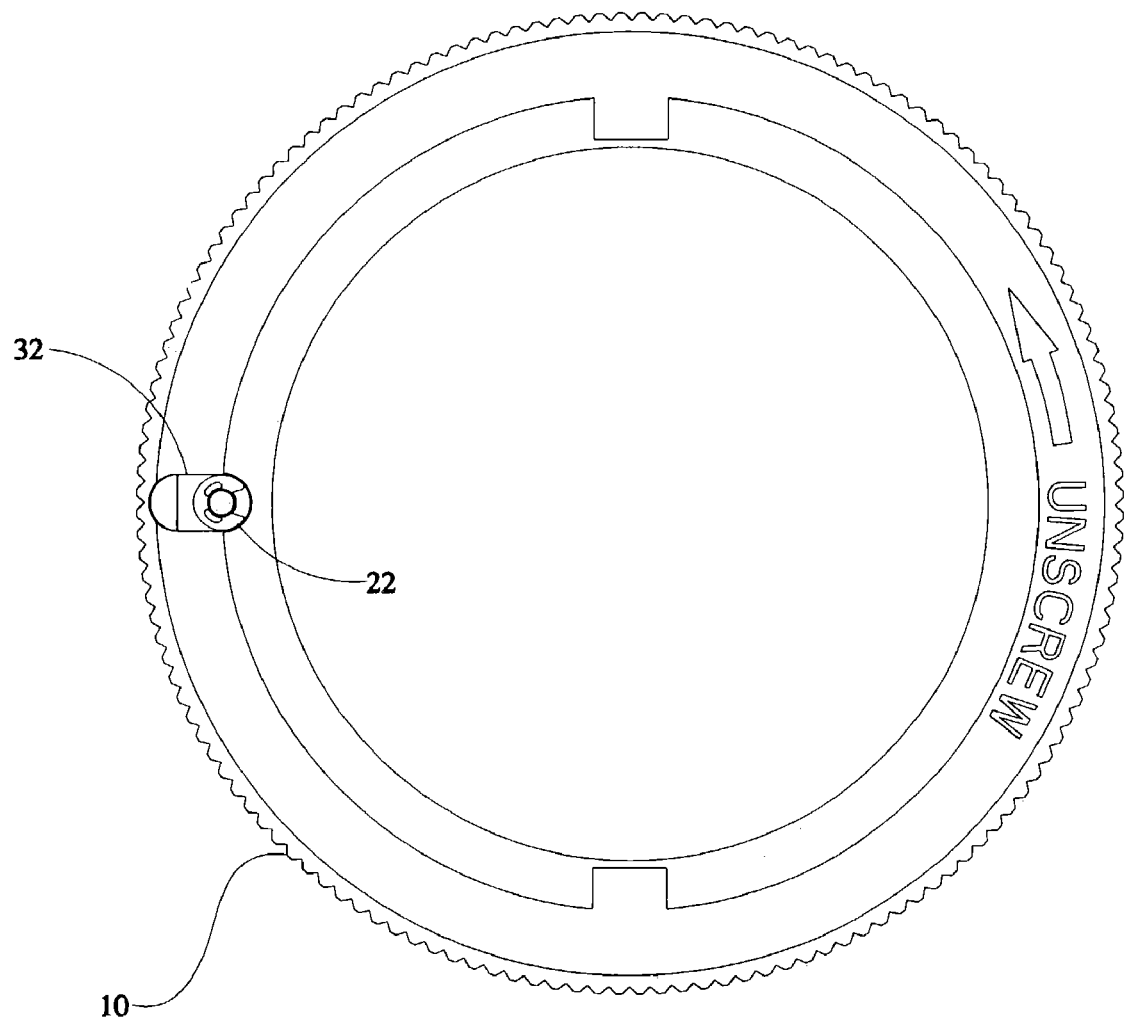
FIG. 5 is a top view of the cover shown in FIG. 4.

In order to lock the cover in position with respect to the drag washer 16, I have provided notches 17 in the drag washer to mate with the head 18 of the pin 20. The pin is retained in the drag cover 10 by means of a retaining ring 22 engaged within a circumferential slot 24 in one end of the pin 20. The pin is disposed in sliding engagement in hole 26, so that it is axially movable therein. The pin is biased away from the retaining ring 22 by means of a spring 28 which rests against a shoulder 30 in the drag cover 10 and exerts the pressure outwardly against the underside of the head 18 of the pin 20. The pin is so dimensioned that in its fully extended position, as shown in FIGS. 1 and 4, it extends beyond the surface of the drag cover 10. In the position shown in FIG. 1, it extends into the notch 17 in the drag washer 16 to lock it in position. The locking drag cover is shown in this position in greater detail in the sectional view, FIG. 4, and top view, FIG. 5.

Figure 6:
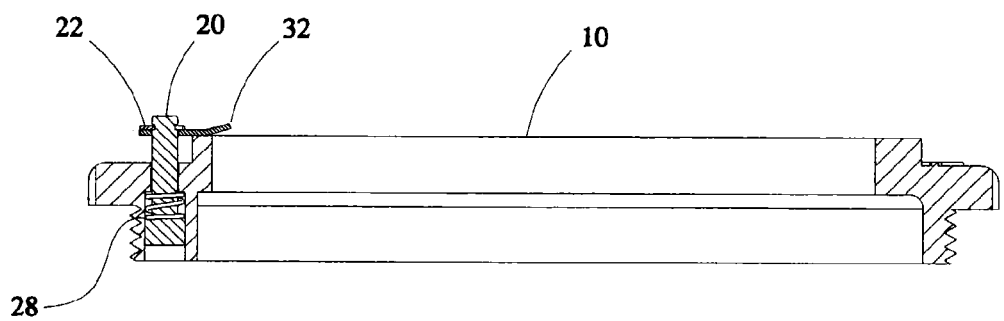
FIG. 6 is a section of an assembled cover with the parts shown in an alternate position.

In order to obtain this position, it is necessary to back the pin 20 off and hold it in a backed-off condition while the drag cover 10 is threaded into the spool 12. This is accomplished by means of the spring clip 32. The spring clip 32 has a hole in it so that the pin 20 can pass therethrough. The hole is such that there is sufficient clearance so that the spring clip 32 can be rotated about the pin. To obtain the position shown in FIG. 6 from the position shown in FIG. 4, an implement such as the blade of a screwdriver can be inserted between the spring clip 32 and the adjoining outer surface of the drag cover 10. To facilitate this insertion, the spring clip 32 can be bent outwardly a slight amount, as shown at A, FIG. 4. Twisting the blade of the screwdriver so that it raises the spring clip and thus the pin, by virtue of the lock washer 22 against the force of the spring 28, will permit the spring clip 32 to move to a position so that when rotated, as shown in FIG. 6, it will be beyond the outermost surface of the drag cover 10. In this rotated position, the screwdriver can be removed so that the spring 28 will exert a force against the head of the pin 20 and draw the pin tightly against the drag cover. In this position, the pin 20 is within the envelope of the drag cover, that is, it does not extend beyond the other surface (as it would in the condition shown in FIG. 4).

In the position shown in FIG. 6, the drag plate 10 can be freely threaded into the spool 12 without interference from the head 18 of the pin 20. Once it is fully threaded into engagement with the spool, as shown in FIG. 1, the spring clip 32 can again be rotated so that the force of the spring 28 will snap it down toward the drag washer 16. If necessary, a slight rotational adjustment of the drag cover can be made so that the head 18 of the pin 20 engages one of the notches 17 in the drag washer. At that point, the drag washer and cover are locked against further rotation.

Figure 7:
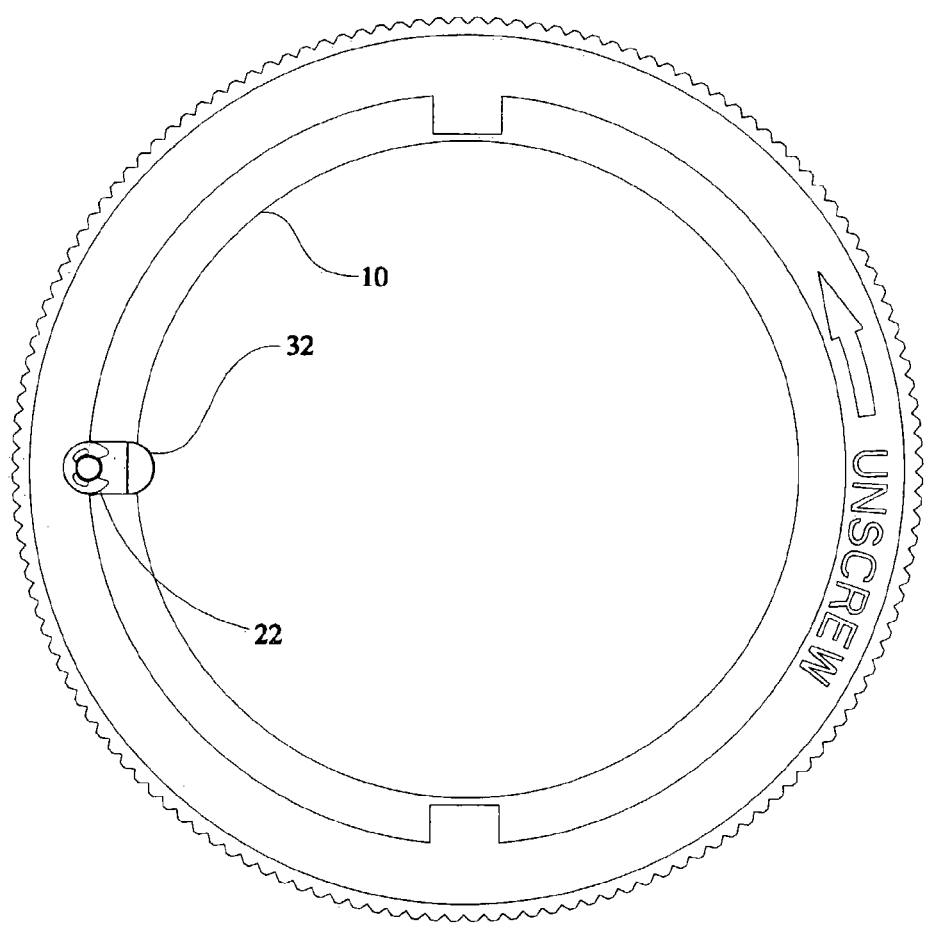
FIG. 7 is a top view of an assembled cover as shown in FIG. 6.

If the user wishes to disassemble the drag cover 10 from the spool 12, the user would first lift the pin by means of inserting an implement between the spring clip 32 and the cover 10 and rotate it to the position shown in FIG. 7, so that the pin is disengaged from the drag washer. The cover can then be unscrewed, as shown by the indicia in FIG. 7.

It should be noted that the notches in the drag washer could be replaced by a number of means, such as a series of holes in the spool flange itself, or a separate stamping or molded part screwed to the spool. Any of these might be functionally equivalent to the invention described above.

What is claimed:

1. In a fishing reel having a spool and a drag mechanism having a drag washer therein, the improvement comprising:

a drag cover means comprising a drag cover in threaded engagement with the spool, to cover said drag mechanism; and locking means engaging said drag cover means and said drag washer to lock said drag washer in position within said reel.

2. The reel of claim 1 wherein the drag washer has at least one notch and the drag cover means has a spring-biased pin means therein for engagement with said notch.

3. The reel of claim 2 further comprising a retraction means engaging said spring-biased pin means to provide a means for retracting said pin means from said notch.

4. The reel of claim 3 wherein the retraction means comprises a clip; and said drag cover has two surfaces, one for engaging said clip when said pin means engages said notch and one for engaging said clip when said pin means is retracted from said notch.

\* \* \* \* \*